No. 682,618. Patented Sept. 17, 1901.
A. H. HICKLEY.
ELECTRICAL STARTING AND REGULATING SWITCH.
(Application filed May 6, 1901.)
(No Model.) 6 Sheets—Sheet 5.
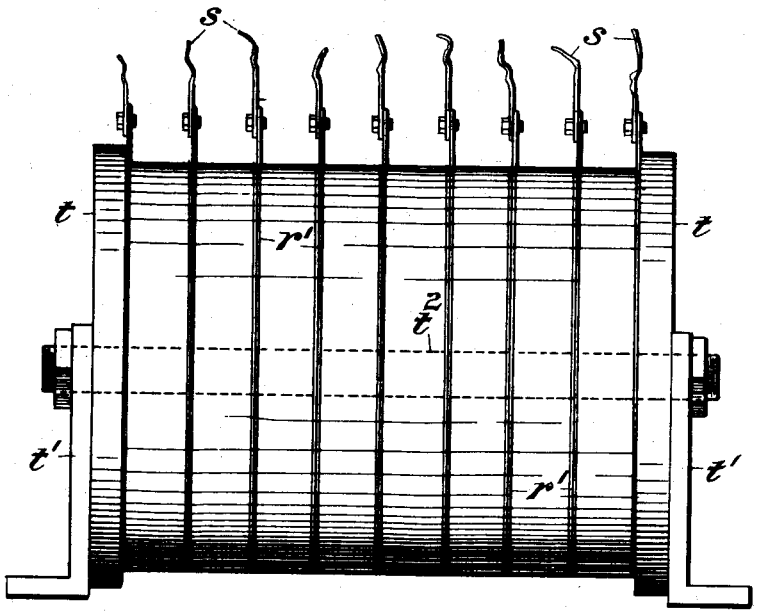
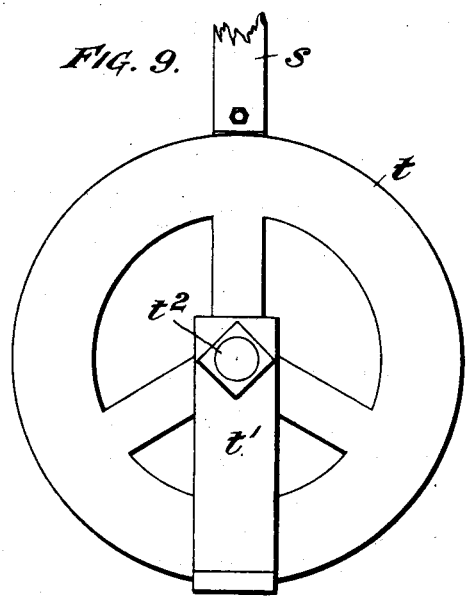
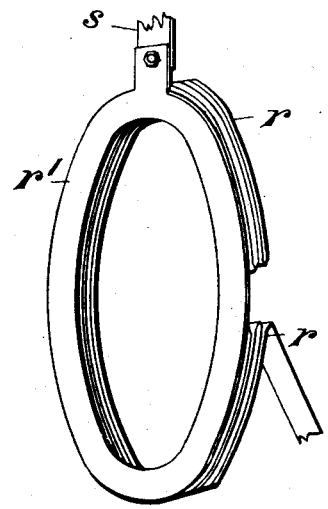
WITNESSES
Comad C. Lake
Percy D. Locke
INVENTOR
Arthur H. Hickley
By James A. Coubrough
Attorney No. 682,618. Patented Sept. 17, 1901.
A. H. HICKLEY.
ELECTRICAL STARTING AND REGULATING SWITCH.
(Application filed May 6, 1901.)
(No Model.) 6 Sheets—Sheet 6.

WITNESSES.
INVENTOR.
Arthur H. Hickley
By James A. Coubrough
Attorney

UNITED STATES PATENT OFFICE.

ARTHUR HENRY HICKLEY, OF ROCK FERRY, ENGLAND.

ELECTRICAL STARTING AND REGULATING SWITCH.

SPECIFICATION forming part of Letters Patent No. 682,618, dated September 17, 1901.

Application filed May 6, 1901. Serial No. 59,027. (No model.)

*To all whom it may concern:*

Be it known that I, ARTHUR HENRY HICKLEY, a subject of the King of Great Britain and Ireland, and a resident of 12 Derby Park, Rock Ferry, Cheshire, England, have invented certain new and useful Improvements in Electrical Starting and Regulating Switches, of which the following is a specification.

This invention relates to electrical switches wherein the switch arm or arms are arranged to travel over a series of contacts attached to graduated resistances; and the objects of the invention are to make the electrical connection between the switch-brush and the contacts more perfect, to extinguish the arc or spark, to provide a means which in the case of a motor-switch will insure that the field-circuit is excited before the resistance-switch arm can be operated, and to improve the construction and arrangement of the resistances.

Figure 1:
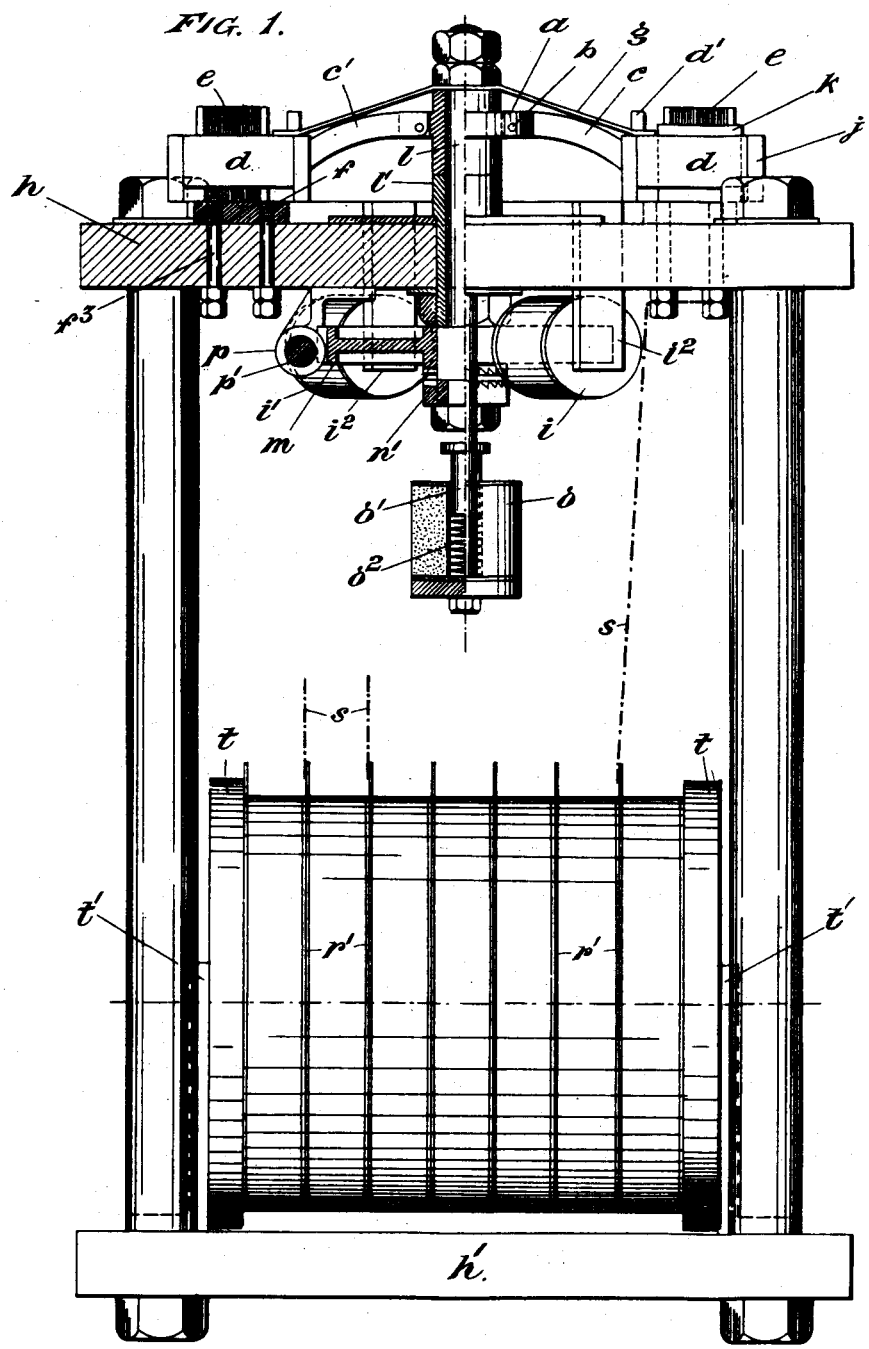
Figure 2:
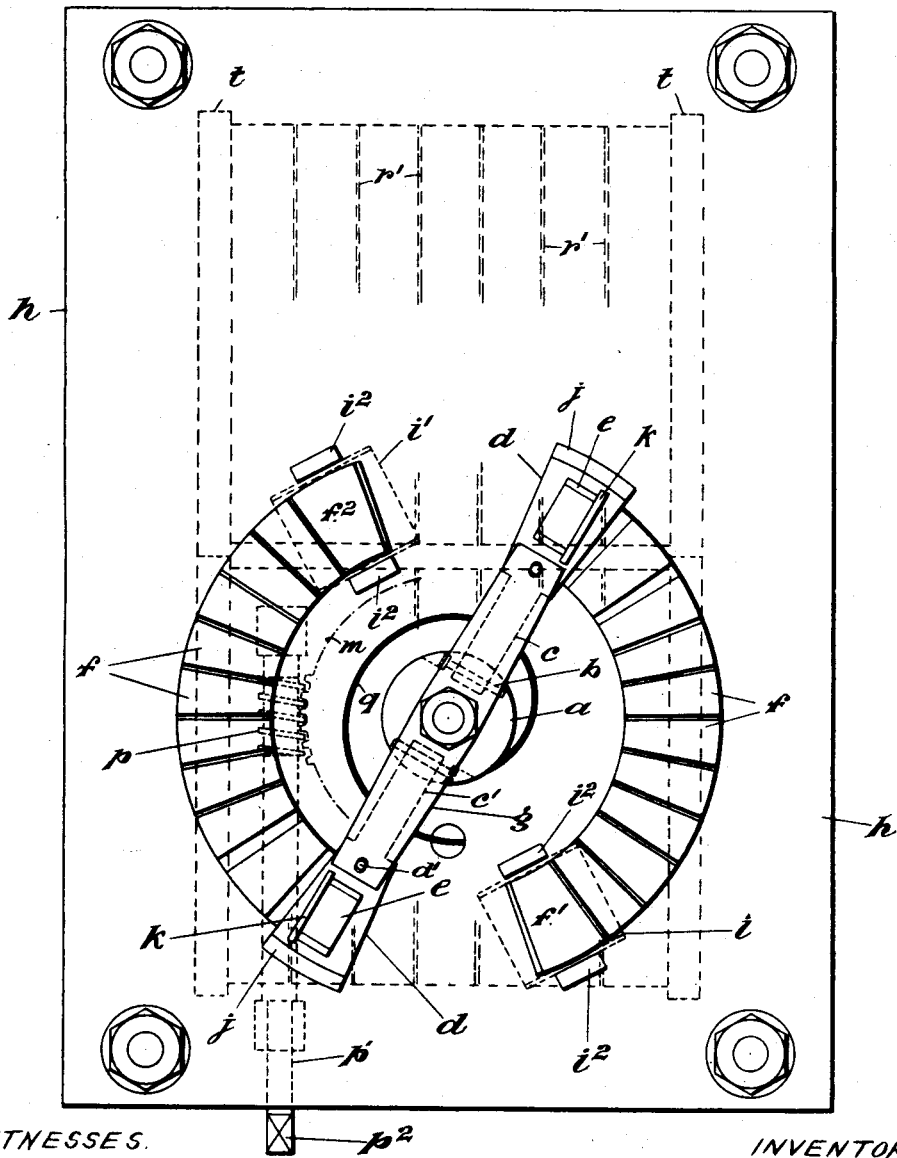
Figure 3:
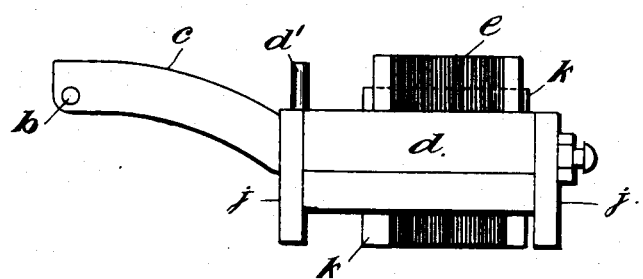
Figure 4:
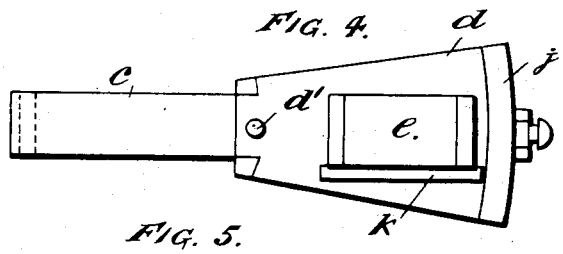
Figure 5:
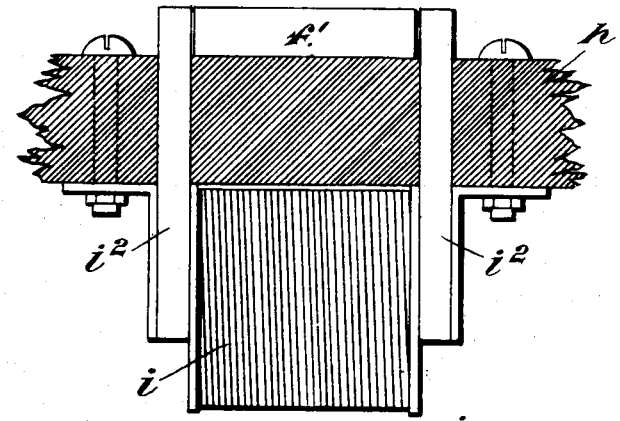
Figure 6:
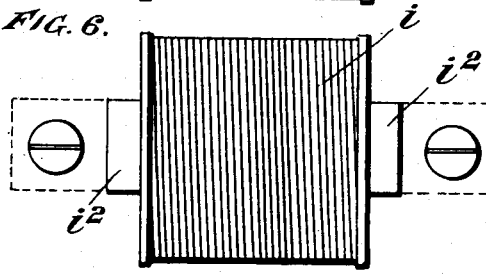
Figure 7:
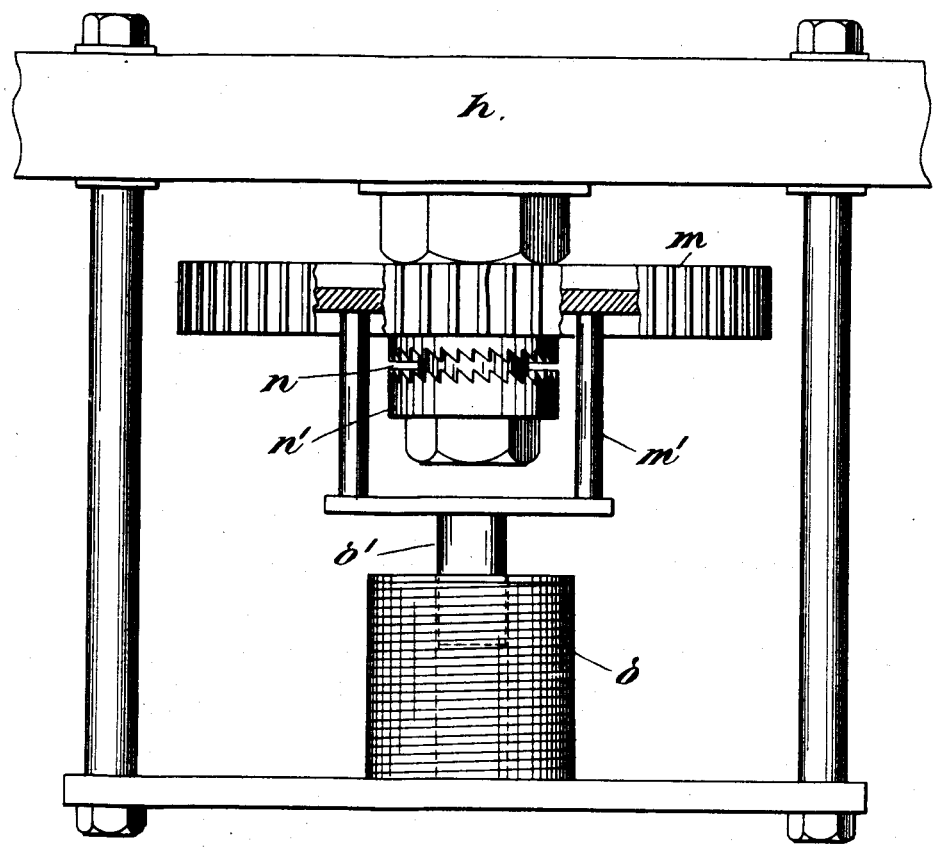
Figure 11:
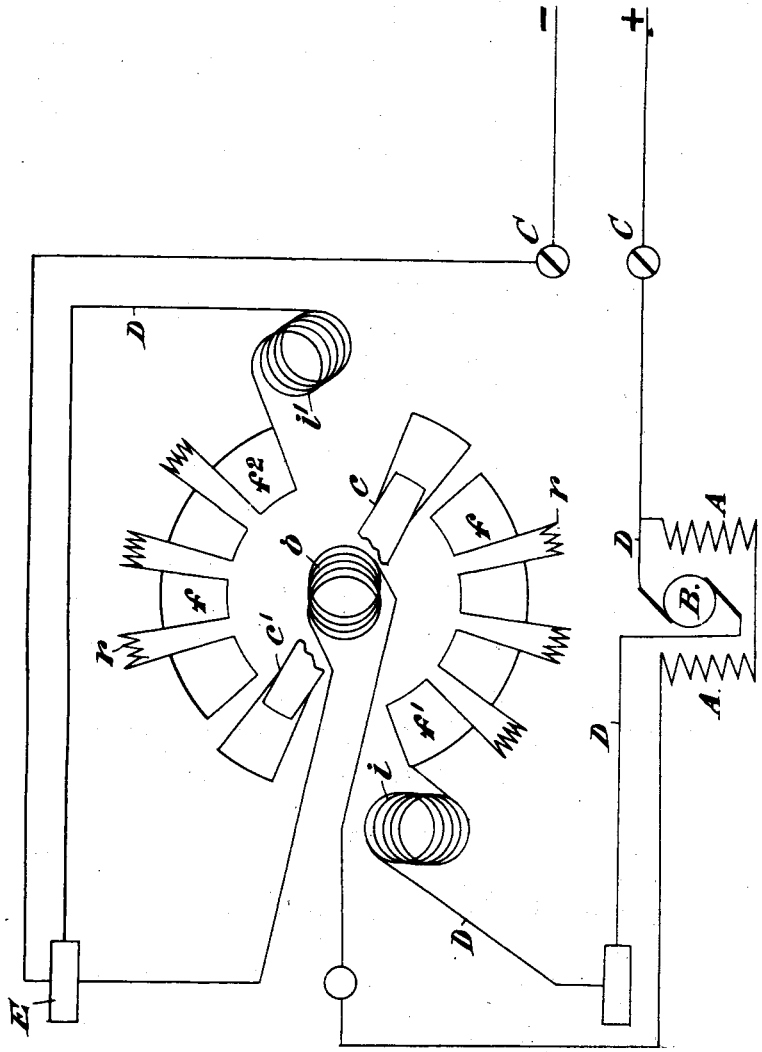

Figure 1 is an elevation, and Fig. 2 a plan, of the general arrangement of the improved switch. Fig. 3 is a side view, and Fig. 4 a plan, of the switch-arm and brush-holder. Fig. 5 is a sectional view, and Fig. 6 a plan, of a magnetic holddown device applied to a switch-contact piece. Fig. 7 is an enlarged view showing a clutch device for operating the switch-arm. Fig. 8 is a side view, and Fig. 9 is an end view, of a bracket for storing the resistances, one of the latter being shown separately in Fig. 10. Fig. 11 shows diagrammatically the circuit through the switch, with its magnets and solenoid, and through the motor.

The switch-arm comprises the disk $a$, to which are hinged (at $b$) the arms $c\ c'$. The outward extremities $d$ of these arms form holders for the brushes $e$. Hinged at $b$ the arms $c\ c'$ are depressed upon the contacts $f$ by the spring $g$, the latter being guided by the pins $d'$. Attached to the base $h$ beneath the contacts $f'\ f^2$ of least resistance are electromagnets $i\ i'$. The pole-pieces $i^2$ of these magnets pass through the base $h$, their upper ends being flush with the contacts $f'\ f^2$. These magnets may be excited in series with the field-circuit or in series with the armature-circuit. Attached to the brush-holders $d$ are soft-iron armatures $j$. Consequently when the switch-arm arrives on the contacts $f'\ f^2$ the soft-iron armatures are influenced by the magnet pole-pieces $i^2$, and the brushes $e$ are drawn into a closer and more perfect electrical connection with the contacts $f'\ f^2$.

Passing loosely through a slot in each brush-holder $d$ in front of the brushes $e$ are wipers, or plates $k$, of mica or other material which is non-conducting. These plates extend to the bottom of the brushes $e$ and operate as the brushes leave the contacts to wipe away or extinguish the arc. As the plates $k$ are worn or burned they sink in their slots in the brush-holder either by their own weight or they are pressed down, and thus always bear upon the contacts $f$.

The sleeve of the disk $a$ is fixedly mounted on the spindle $l$, which is revoluble in the brush $l'$. Loosely mounted on this spindle is the worm-wheel $m$. The boss of this wheel is cut with teeth and forms one-half of a toothed clutch $n$. The lower half $n'$ of this clutch is fixedly mounted on the spindle $l$. Supported from the base $h$ is a solenoid $o$, which in the case of a shunt-motor switch is excited by the field or main circuit of the motor, as desired. The core $o'$ of this solenoid is carried by a frame $m'$, attached to the worm-wheel $m$. A spring $o^2$ operates to expel the core when the solenoid is out of circuit. Gearing with the wheel $m$ is a worm $p$, mounted on a spindle $p'$, which is squared at $p^2$ to receive the switch-operating hand-wheel. The operation of this gear is as follows: When the field-circuit is made, the solenoid $o$, by means of the core $o'$ and frame $m'$, draws down the wheel $m$, so that the clutch $n$ is put in engagement and the spindle $p'$, worm $p$, wheel $m$, clutch $n$, spindle $l$, and switch-arm disk $a$ are put in gear, whereby the switch-arm may be moved over the contacts $f$ by a hand-wheel on the spindle $p'$. If now the field-circuit is broken or fails, the solenoid $o$ is no longer excited, and the spring $o^2$ expels the core $o'$ and by raising the wheel $m$ disengages the clutch $n$. The disengaged spindle $l$ and switch-arm are now operated by the fly-off spring $q$, which returns the switch-arm to the "off" position. While the field-circuit remains broken, the clutch $n$ remains disengaged, and in this condition revolution of the hand-wheel spindle $p'$ will merely turn the wheel $m$ idly upon the spindle $l$, the switch-arm remaining stationary. Hence while the solenoid $o$ remains out of circuit the switch-arm cannot be moved.

The resistances of the contacts $f$ are stored on a lower platform $h'$, as shown in Fig. 1. These resistances are formed of circular metallic stampings $r$, arranged in zigzag form, as shown in Fig. 10—namely, the ends of the stampings are soldered together, the outer ones being soldered to the brass rings $r'$, which form the electrical terminals of the resistance. Each stamping or strip $r$ may be spaced or separated by asbestos or other insulating material. The individual resistances are connected up with the switch-contacts $f$ by the ribbons $s$, the lower ends of the latter being attached to the resistance-rings $r'$, while their upper ends are held between nuts on the securing-studs $f^3$ of the contacts $f$. The resistances are stored bookwise between disks $t$ and brackets $t'$, which are clamped together by nuts on the central rod $t^2$. The switch illustrated is provided with two nests of resistances, as shown in dotted lines in Fig. 2.

The electrical connections of the switch are shown in Fig. 11. This example illustrates the connections of the switch when employed with a shunt-motor, and it will be understood that these connections will be modified when the switch is employed with electromotors of other types. Entering from the source by the positive main the current excites the field-magnets A of the motor B and also the solenoid $o$, this circuit being controlled by the double-pole switches C. A shunt D from this circuit is closed by the switch-arm $c\ c'$ and passes through the armature B, through the winding of the magnets $i\ i'$, through the contacts $f f' f^2$ and their resistances $r$, and returns to the negative main at the terminal E.

Having now described my invention, what I claim as new, and desire to secure by Letters Patent, is—

1. In combination, the disk $a$, the switch-arms $c, c'$ hinged to said disk, the brush-holders $d$ formed on the ends of said arms, and the spring $g$ guided by pins $d'$ and adapted to press the brushes of the switch onto the contacts $f$, as described.

2. In combination, a hinged switch-arm, the brush-holders $d$ on said arm, soft-iron armatures $j$ attached to said brush-holders, and the electromagnets $i$, $i'$ the pole-pieces $i^2$ of which being disposed so that they influence said armatures and draw the brushes $e$ into closer electrical connection with the contact disposed between said pole-pieces, as described.

3. In combination, a contact such as $f'$ on a base $h$, an electromagnet $i$ disposed beneath said contact and base, the pole-pieces $i^2$ of the magnet passing through said base so that their ends are flush with said contact and a switch-arm provided with soft-iron armatures $j$ so disposed that the influence of the magnet upon the armatures draws the switch-brush $e$ into closer electrical connection with the said contact, as described.

4. In combination, a switch-arm brush-holder, a slot therein at the side of the brush, and a spark-extinguishing plate $k$ of insulating material loosely disposed in said slot, whereby the plate rests on the contacts $f$ and extinguishes the spark, as described.

5. In combination, the spindle $l$, the switch-arm disk $a$ and half-clutch $n'$ fast thereon, the worm-wheel $m$ loose thereon and attached to the core $o'$ of a solenoid $o$, wound in series with the field-circuit, a spring $o^2$ for expelling the core and raising the wheel $m$ out of engagement with the half-clutch $n'$ and a hand-wheel spindle $p'$ and worm $p$ gearing with said worm-wheel, whereby when the field-circuit is made the solenoid $o$ closes the clutch $n$ and places the switch-arm and hand-wheel spindle $p'$ in gear, and when said circuit is broken the spring $o'$ opens the clutch $n$ and throws the switch-arm out of engagement, as described.

6. In combination the contacts $f$ attached to the base $h$ by the studs $f^3$ the platform $h'$ suspended from said base, brackets $t'$ on said platform, the resistances $r$, terminal rings $r'$ and disks $t$ secured between the brackets $t'$ by the bolt $t^2$, and the ribbons $s$ forming an electrical connection between the rings $r'$ and the contact-studs $f^3$, as described.

ARTHUR HENRY HICKLEY.

Witnesses:
JAMES A. COUBROUGH,
CONRAD C. LOCKE.